C. S. ASH.
WHEEL HUB.
APPLICATION FILED AUG. 10, 1918.

1,314,380.

Patented Aug. 26, 1919.

INVENTOR
C. S. Ash
BY
Dull, Warfield & Dull
ATTORNEY

UNITED STATES PATENT OFFICE.

CHARLES S. ASH, OF GENEVA, NEW YORK.

WHEEL-HUB.

1,314,380.

Specification of Letters Patent.

Patented Aug. 26, 1919.

Application filed August 10, 1918. Serial No. 249,275.

*To all whom it may concern:*

Be it known that I, CHARLES S. ASH, a citizen of the United States, residing at Geneva, in the county of Ontario and State of New York, have invented certain new and useful Improvements in Wheel-Hubs, of which the following is a full, clear, and exact description, such as will enable other skilled in the art to which it appertains to make and use the same.

This invention relates to quick-detachable vehicle wheels of the type wherein an outer hub, with associated parts, removably fits over an inner hub arranged on the axle, and one of the hubs is provided with pins or lugs which project into complementary sockets in the other to effect transmission of the driving and braking forces.

One of the objects of the invention is to provide an improved construction of sockets in the outer hub adapted to receive pins on the inner hub, and whereby relative wear or mutilation in service of the parts mentioned is eliminated.

Other objects and advantages will be in part noted hereinafter in connection with the following description of the accompanying drawing, which illustrates typical embodiments of the invention, and in which—

Figure 4:
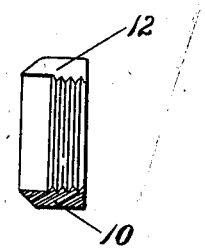

Fig. 4, a central vertical section thereof.

Referring more specifically to the drawing, there is shown a sheet metal outer hub 1 attached, by spokes or otherwise, to the tire-carrying rim and removably fitting over an inner driving hub 2. The latter is arranged for mounting on the vehicle axle through interposed bearings. In wheels of this type the driving and braking forces may be transmitted from the inner to the outer hub by rigid axially projecting lugs on the former received in complementary openings or sockets in the latter.

Figure 1:
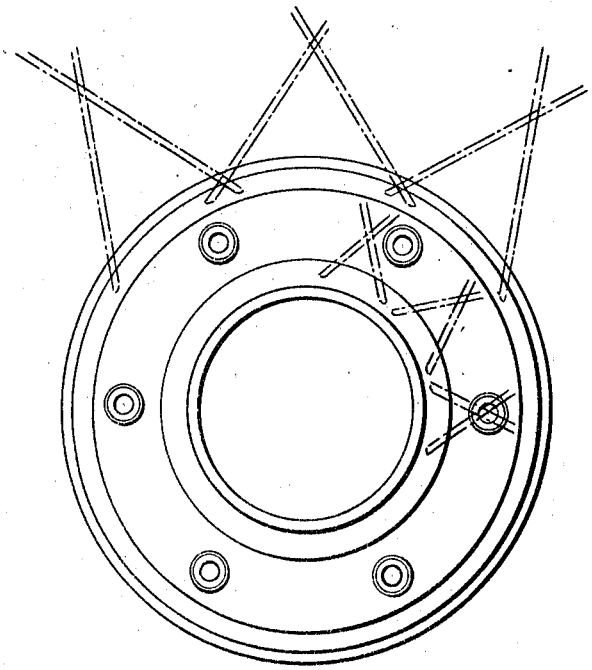
Figure 1 is an end elevational view of an outer hub assembled on an inner hub.
Figure 2:
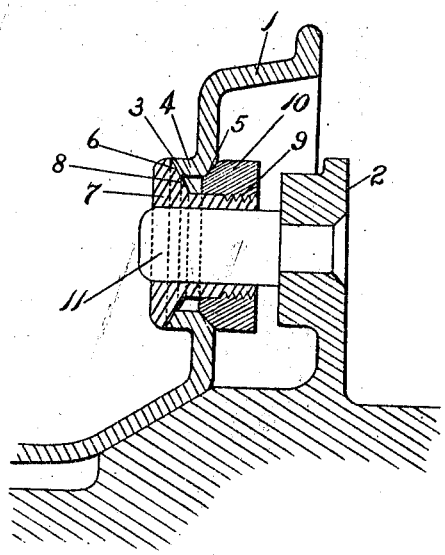
Fig. 2 is an enlarged sectional view on the line 2—2 of Fig. 1.

As shown in Fig. 2, by the present invention the outer hub 1 is provided with a plurality of openings 3 with the walls thereabout outturned or inturned to provide bosses 4 beveled, by machining or otherwise, at the inner edge 5 and outer edge 6. Bushings 7, preferably of hardened metal, are extended through the openings 3 and are provided at one end with beveled heads 8 and at the other end with threads 9 to receive a threaded nut 10, also beveled. The outer diameter of the cylindrical portion of the bushing 7 is preferably less than the inner diameter of the openings 3, whereby before nut 10 is tightened, the bushings have a limited capacity for eccentric disposal with respect to bosses 4, and whereby they are automatically centered in correct symmetrical position when the nuts are screwed home.

The inner hub 2 is provided with a similar number of rigid driving pins 11 extending outwardly and arranged to enter and project through bushings 7. When the parts are assembled, with nut 10 tight and the elongated bushings 7 wedged into rigid relation with the outer hub, the bushings present elongated and hardened bearing surfaces to take up the strain and wear imposed by forces transmitted through the driving pins. By reason of this construction the interlock between the hubs to prevent their relative rotation is permanently reliable and the parts in contact practically free from subjection to wear or mutilation in service with attendant knocking or other disadvantage.

Figure 3:
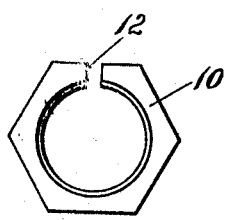
Fig. 3 is an end view of a modified form of clamping nut.

In the modified form shown in Figs. 3 and 4 the clamping nut 10 is split axially at 12, whereby, as the nut is tightened on the bushing its beveled engagement with wall 5 effects wedging with the latter and also contraction and locking on the bushing. In both forms it is to be noted that the headed bushing affords an enlarged and hardened bearing surface to receive the driving pins so that direct contact of the latter against the weakened metal of the outer hub 1 is avoided, and the attendant described functional advantages insured.

Having described my invention, what I claim as new and desire to secure by Letters Patent is:

1. In a device of the character described, in combination, a wheel hub having spaced axial apertures therein to receive driving pins, the side walls about said apertures being beveled, bushings disposed through said apertures and having beveled heads to fit against corresponding portions of said walls, and clamping nuts threaded on the opposite ends of said bushings and provided with beveled ends to fit against the corresponding portions of said walls whereby said bushings may be wedged firmly in position to afford elongated bearings for the driving pins, 2. In a device of the character described, in combination, a wheel hub having spaced axial apertures therein to receive driving pins, the side walls about said apertures being beveled, bushings disposed through said apertures and of slightly lesser diameter than the same and having beveled heads to fit against corresponding portions of said walls, and clamping nuts threaded on the opposite ends of said bushings and provided with beveled ends to fit against the corresponding portions of said walls whereby said bushings may be wedged firmly in centered position to afford elongated bearings for the driving pins.

3. In a quick-detachable vehicle wheel, an inner hub having circumferentially spaced axially disposed driving pins, an outer hub to removably fit on said inner hub and having correspondingly placed sockets to receive said pins, said sockets comprising apertures in the outer hub with the walls thereabout beveled, headed bushings extending through said apertures, and split clamping nuts threaded on said bushings and provided with beveled portions to bear against corresponding portions of said walls whereby said bushings may be wedged in position and said clamping nuts automatically contracted thereon when tightened.

In testimony whereof I affix my signature in the presence of two witnesses.

CHARLES S. ASH.

Witnesses:
J. R. WATSON,
H. E. VAN HORN.